United States Patent [19]
Rusk

[11] 4,414,041
[45] Nov. 8, 1983

[54] GUIDE SYSTEM FOR FLAME CUTTING OF PIPE

[76] Inventor: Richard W. Rusk, Rte. #1, Box 336, Simpson Dr., Waldorf, Md. 20601

[21] Appl. No.: 341,821

[22] Filed: Jan. 22, 1982

[51] Int. Cl.³ .............................................. B23K 7/04
[52] U.S. Cl. ..................................... 148/9.6; 266/54; 266/56
[58] Field of Search ............................. 266/54, 56, 76; 148/9 R, 9.6

[56] References Cited

U.S. PATENT DOCUMENTS

| | | | |
|---|---|---|---|
| 1,352,381 | 9/1920 | Reynolds | 148/9.6 |
| 1,991,117 | 2/1935 | Porteous et al. | 266/54 |
| 3,856,283 | 12/1974 | Johnson | 148/9.6 |
| 4,273,313 | 6/1981 | DeNardo | 266/76 |

*Primary Examiner*—W. Stallard
*Attorney, Agent, or Firm*—John F. McClellan, Sr.

[57] ABSTRACT

A guide system for a gas cutting torch used to bevel the ends of pipe in preparation for welding includes a circular sleeve with integral spacer bars coacting with a radial screw for fixing the circular sleeve coaxially around a pipe to be bevelled; the sleeve has an end bevelled at the same angle at which the pipe is to be bevelled; an adjustable follower or torch-holding stepped-spool engages the sleeve bevel to reproduce that bevel angle on the pipe end and engages a groove around the sleeve adjacent the sleeve bevelled end for axial constraint of the gas cutting torch; the coaxial circular form of the stepped spool permits a user to rotate a gas cutting torch about the axis of the flame for better maneuverability without disturbing smoothness of cut; the groove structure defines an open "V"-section groove to permit rocking the torch for burning an initial hole adjacent to but clear of the area to be bevelled.

9 Claims, 5 Drawing Figures

GUIDE SYSTEM FOR FLAME CUTTING OF PIPE

FIELD OF THE INVENTION

This relates generally to tool systems and particularly to a guide system for flame cutting of pipe.

BACKGROUND OF THE INVENTION

Straight lengths of pipe are commonly joined by butt-welding. Large numbers of butt-welded joints are made every day, worldwide in almost every industry.

To prepare for making such a joint, one or both lengths of pipe to be joined must be cut to exact length and the ends prepared to receive the weld. Usually the end of each pipe is bevelled at 37°, so that abutting the ends of the two pipes forms a symmetrical "V" groove of 74° included angle all around the joint to receive the welding bead, electric welding being taken as an example.

Bevels are usually formed on pipe ends either by machining, which is expensive and cumbersome, or by use of a gas cutting torch.

A gas cutting torch such as an oxy-acetylene torch has the advantages of being quick, economical, lightweight, compact and easily maneuvered, but it requires years of experience to produce best results in pipe bevelling with a torch.

A guide has been described for use in flat plate cutting with a gas torch, in U.S. Pat. No. 4,273,313 issued on June 16, 1981 to John M. DeNardo for GUIDE FOR A CUTTING TORCH. This patent discloses a cam with a convex axial face for installation on a torch tip to guide on a flat plate in cutting flat work.

In addition, large, complex, heavy automatic equipment for pipe bevelling by flame is known.

OBJECTS OF THE INVENTION

However, no system is believed to have been provided that enables a comparatively un-skilled workman to become an instant expert and immediately produce professional results in gas-torch bevelling of pipe in preparation for welding, and to provide such is a principal object of this invention.

Further objects are to provide a system as described which can be adapted for use on any size pipe, which requires no unusual materials or close tolerances, which is usable overhead and in tight quarters, with or without rotation of the pipe being worked, and which is safe and economical to use.

Yet a further important object is to provide a system as described which will become the standard equipment in commerce for the purpose of bevelling of pipe by manually manipulated gas cutting torches.

BRIEF SUMMARY OF THE INVENTION

In brief summary given as cursive description only and not as limitation, the invention includes an annular-track member applicable to a pipe that is to be bevelled by a gas cutting torch, and a follower applicable to a gas cutting torch tip for coacting with the annular track member to guide manual manipulation of the gas cutting torch in bevelling a pipe while permitting rotation of the gas cutting torch for start-up to produce an offset hole, and during bevelling operations for clearance, comfort and convenience without causing roughness of cut.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
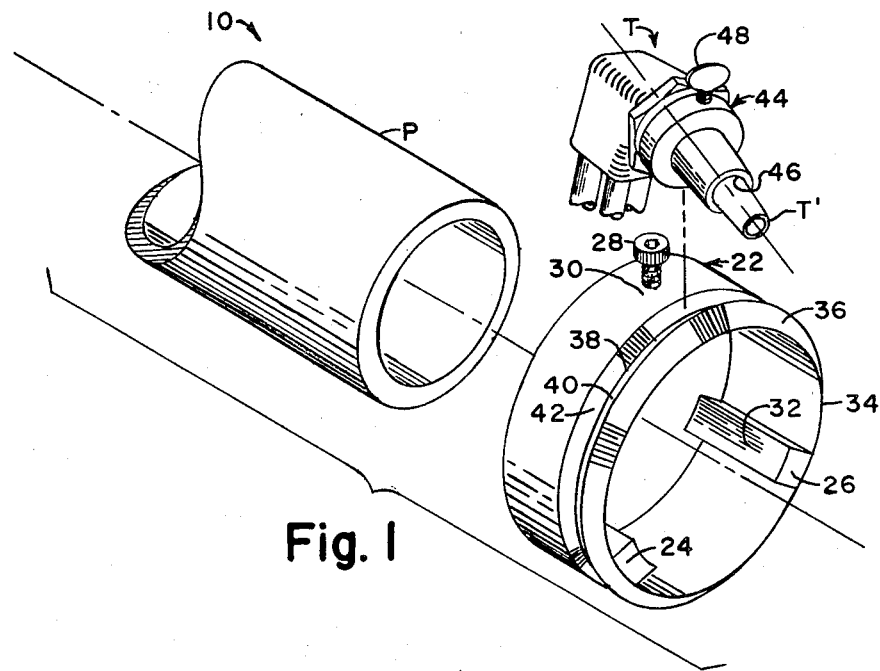
FIG. 1 is a perspective exploded view of the elements of the invention, a pipe to be bevelled, and a cutting torch.

FIG. 1 shows the invention 10 in exploded view, as comprising a track means which includes a short circular sleeve 22; the sleeve has first and second spacer bars 24, 26 welded to the interior surfaces and an attachment screw 28 threaded through the wall at 30, all on circumferentially aligned 120° spacings.

Each spacer bar has a pipe-supporting surface 32 located for holding a pipe P concentrically in the sleeve 22 in conjunction with the other spacer bar and the screw. The pipe-supporting surfaces are preferably concave, with the same radius as the pipe, for secure, position defining, low-unit-pressure support.

One end 34, the front or working end of the sleeve 22 has a flat-section 36 or chamfer formed on it, as by machining, to serve as a torch-angle guide. The bevel preferably is at the same angle to the sleeve axis as the intended bevel on the end of pipe P. Thirty-seven degrees to the axis is customary. This bevel forms part of the track to guide the torch by means to be explained. The remainder of the track is a "V"-section groove 38 adjoining the bevel 36 around the periphery of the sleeve 22. In section, the forward face 40 of the "V"-section groove forms a ninety degree angle with the thirty-seven degree chamfer 36 and the rearward face 42 forms a ninety degree included angle with the forward face 40.

To fit in the track, to hold a torch T and to guide it around the track in flame-cutting when the torch is manually manipulated to produce a bevel or chamber on the pipe P, a circular, stepped-diameter spool 44 is provided. The spool has through it, a coaxial bore 46 sized to fit the tip T' of a chosen torch. A screw 48 adjustably fixes the spool to the torch tip.

Figure 2:
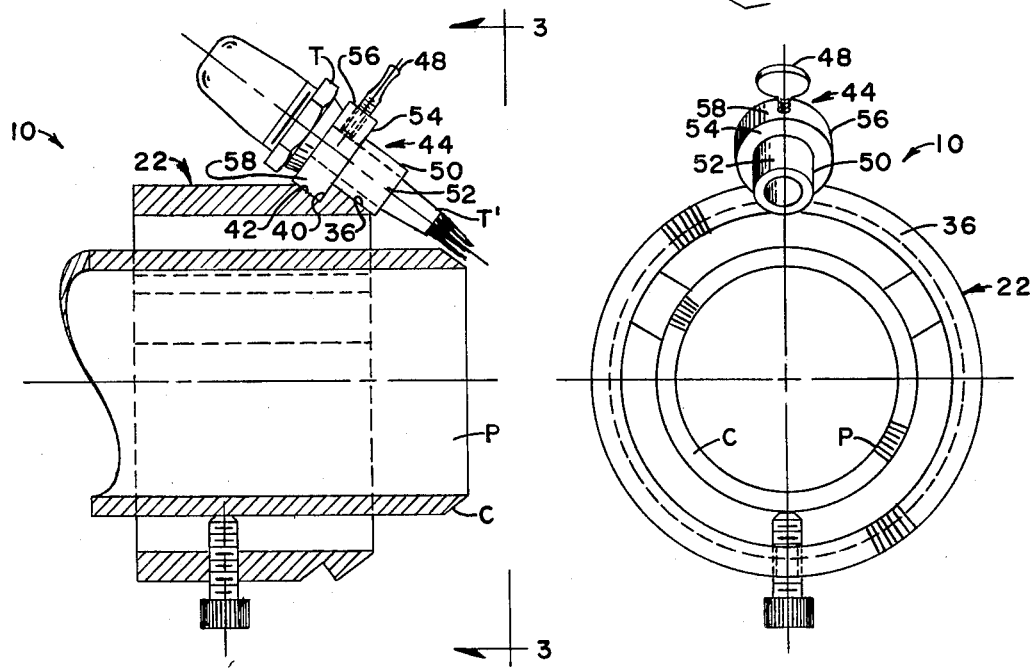
FIG. 2 is a side elevational view in partial section diagramming the working relation of the parts of the invention to cutting torch and pipe to be worked.
Figure 3:
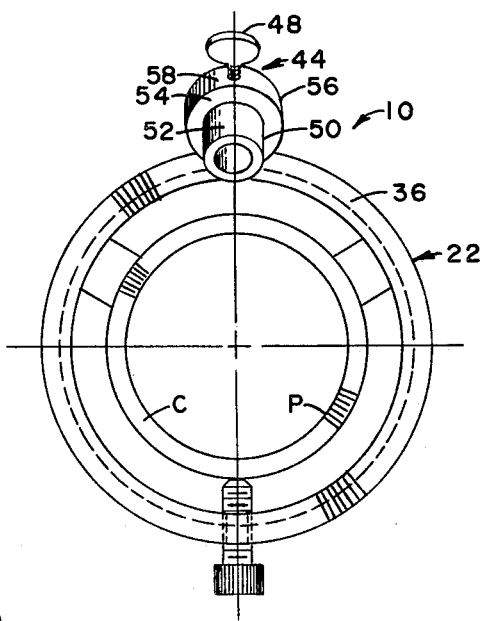
FIG. 3 is an end elevational view adapted from 3—3, FIG. 2.

FIGS. 2 and 3 indicate relations of the elements of the invention 10 assembled and producing a smooth chamfer C on the end of a pipe P by means of a flame cutting torch T.

Torch T is guided by the spool 44 through these engagements as viewed in side-elevation sectional aspect;

the periphery 50 of the smaller cylindrical step 52 of the spool 44 positions the torch angle by riding flat on the bevel 36 of the sleeve 22;

the radial shoulder 54 between the smaller cylindrical step 52 of the spool and the periphery 56 of the larger cylindrical step 58 of the spool rides flat on the first face 40 of the "V"-section groove and axially constrains the torch in one direction;

the periphery 56 of the larger cylindrical step 58 of the spool rides flat on the second face 42 of the "V"-section groove and axially constrains the torch in the other direction.

Importantly, these interfit provisions of circular spool engagement of groove and bevel permit the user to rotate the torch about the axis of the flame in passing the torch around a fixed pipe P without affecting smoothness or accuracy of cut. For example, when cutting overhead, the user can comfortably hold the torch handle with the same grip while cutting an arc of 120° or more; in theory the user could bevel all the way around a fixed pipe without releasing grip on the torch, because of these inventive provisions. Even in cases where the pipe can be rotated in a jig, the user has the option to shift the angle of holding about the torch tip axis or flame axis for less fatigue.

When shifting from one size pipe to another it is only necessary to use a different size sleeve 22 and to adjust axial position of the torch tip in the spool, loosening the screw on the spool and tightening it as desired. A thumb screw can be used on the sleeve equally as well, for quick setting and release. It will be evident that a recessed, socket head screw can be used instead of thumbscrew or other type screw, on either the sleeve or spool.

Figure 4:
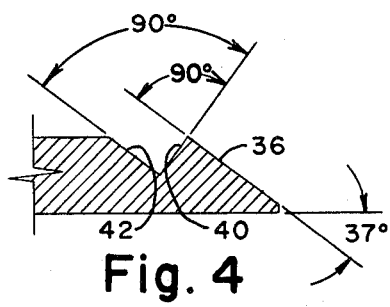
FIG. 4 is a fragmentary sectional detail of a portion of the invention showing preferred angular relation of structural features.

FIG. 4 details in axial, sectional view the preferred relations of the spool-guide provisions on the sleeve including the end chamfer or bevel 36 of thirty-seven degrees to the axis, the ninety degree relation of the first or adjacent face 40 of the "V" section groove to the end bevel, and the included angle of ninety degrees faces 40, 42 of the "V"-section groove between them.

Figure 5:
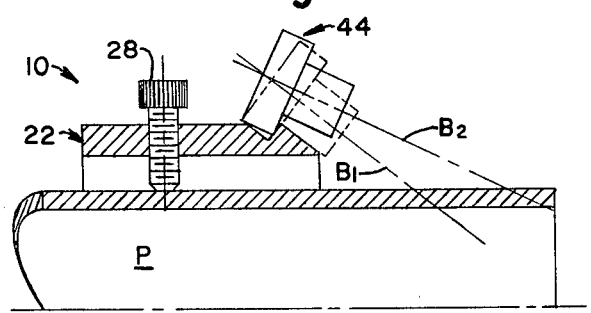
FIG. 5 is a detail of a fragment of FIG. 4 indicating a start-up-position provision of the invention.

FIG. 5 in a detail similar to FIG. 2, shows a further important aspect of the invention. To start a bevel in a pipe P the user must avoid roughness caused by flame gouging or overheating an area of the planned bevel. This invention by means of the open angle of the "V" section groove, and by omitting other constraint than manual, provides for the torch to be rocked back without disengaging it from the track, assuring startup holeburning clear of the planned bevel area but adjacent to it.

The spool bevelling position is indicated by broken lines $B_1$ and the rocked back position is indicated by solid lines with centerline $B_2$ showing where the flame would be directed for burning an initial hole from which the bevel could then be smoothly developed by resumption of the normal relation of spool and track.

The components of the invention may be of mild steel.

Sizes of the components may be as follows, in a typical embodiment for working 8 inch (20 cm) pipe; sleeve diameters, outside 11 inches (28 cm), inside about 10 inches (25 cm); sleeve length 2 inches (5 cm); the spacer bars may extend full length along the sleeve; they may be ⅜ inch (1.7 cm) thick; to bring the fit to the typical O.D. on a nominal 8 inch pipe.

The spool may be 0.1 inch (2.5 cm) long, the larger-circumference step may be 0.4 inch (10 mm) long and 1.385 inch (3 cm) in diameter; the smaller step may be 0.940 inch (2.3 cm) in diameter; the spool bore is sized to fit the torch tip, usually torch tip diameter will range from 178 inch (1.3 cm) to ⅜ inch (1.7 cm) in diameter.

This invention is not to be construed as limited to the particular forms disclosed herein since these are to be regarded as illustrative rather than restrictive. It is, therefore, to be understood that the invention may be practiced within the scope of the claims otherwise than as specifically described.

What is claimed and desired to be protected by United States letters patent is:

1. In a system for precision angle-bevelling of an end of a pipe using a manually held gas cutting torch of the type having a torch tip aligned with a cutting flame of the gas cutting torch and having: track means, means for holding said track means coaxially on a pipe to be bevelled by a said gas cutting torch and means for guiding a said gas cutting torch around said track means under manual manipulation of said gas cutting torch, the improvement comprising: the track means including a sleeve with an end thereof bevelled at the same angle as said angle to be bevelled on a pipe, and said guiding means including means for positioning a said gas torch cutting tip in alignment with said sleeve bevelled-end, by riding on said sleeve bevelled-end.

2. In a system as recited in claim 1, the track means further including said sleeve having a groove therearound adjacent said sleeve bevelled end, and the guiding means having means for engaging said groove and adjustably constraining a said gas cutting torch tip in an axial direction.

3. In a system as recited in claim 2, and means permitting a user to rock back a said torch for start-up, coomprising said groove being a "V"-section groove.

4. In a system as recited in claim 3, the "V"-section having an included angle of ninety degrees.

5. In a system as recited in claim 2, said guiding means including: a spool with a bore therethrough, a larger portion and a smaller portion with a radial shoulder therebetween, said means for positioning being said smaller portion, said means for engaging being said radial shoulder and said larger portion, and said adjustably constrainining means including means for adjustably fixing a gas cutting torch tip in said bore.

6. In a system as recited in claim 5, means permitting a user to rotate a gas cutting torch about a said cutting flame while preserving a smooth cut, comprising said spool being a circular, coaxial spool.

7. In a system as recited in claim 1, said means for coaxially holding comprising said sleeve having therein first and second spacer bars and a radial screw, all said spacer bars and screw being equally spaced around said sleeve.

8. In a system as recited in claim 7, each said spacer bar having a concave surface for engaging a said pipe to be held, said concave surface having a radius equal to a radius of a said pipe to be held.

9. A method for end-bevelling a pipe to a pre-determined angle comprising: fixing a sleeve coaxially around the pipe, guiding a gas cutting torch around the pipe by contact with a bevelled end on said sleeve, and positioning said gas cutting torch axially by engagement with groove structure around said sleeve.

* * * * *